UNITED STATES PATENT OFFICE.

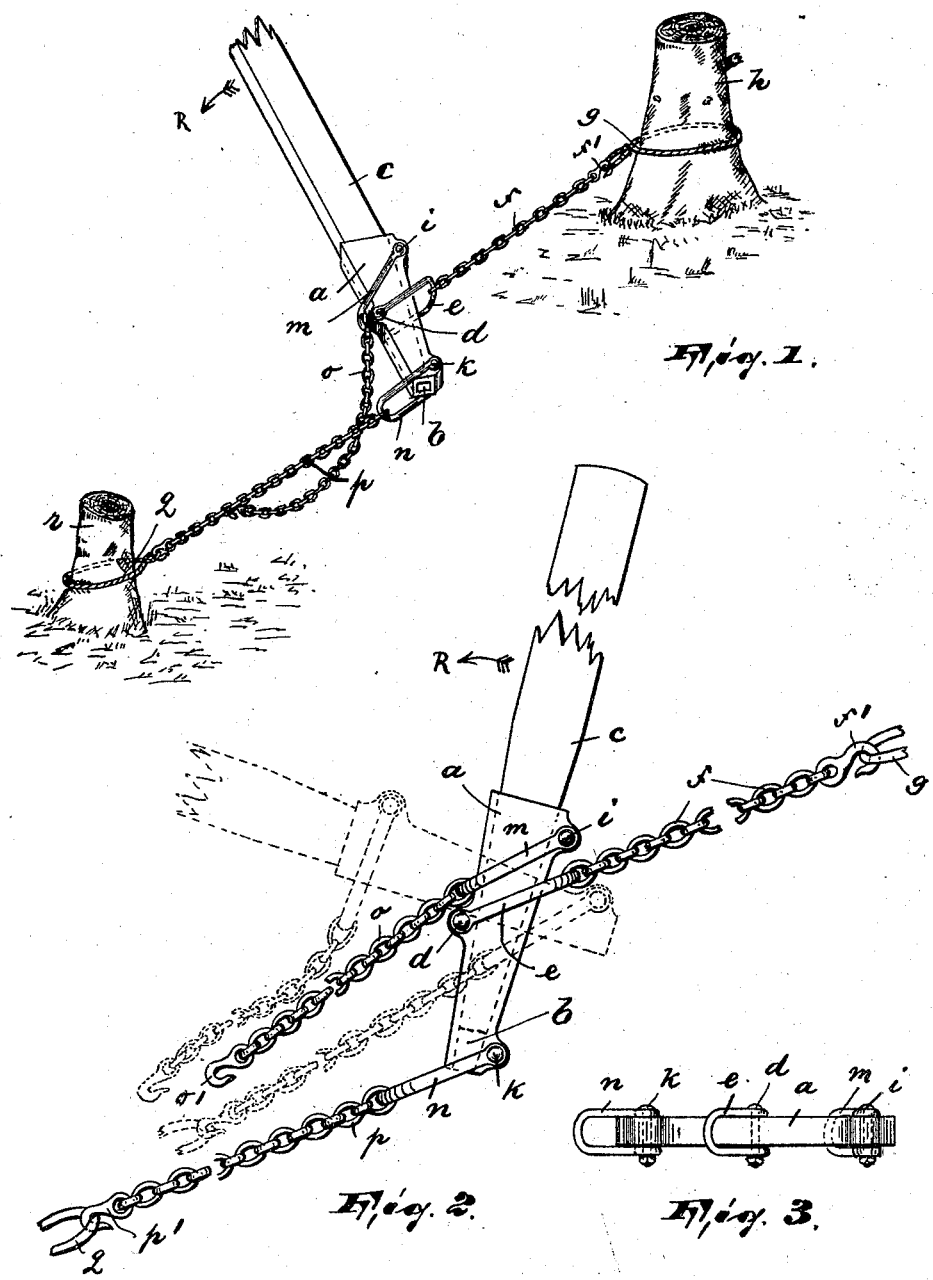

ALBERT FORRER, OF RAMSEY, NEW JERSEY.

STUMP OR TREE EXTRACTOR.

SPECIFICATION forming part of Letters Patent No. 612,586, dated October 18, 1898.

Application filed February 17, 1898. Serial No. 670,610. (No model.)

*To all whom it may concern:*

Be it known that I, ALBERT FORRER, a citizen of Switzerland, residing in Ramsey, Bergen county, and State of New Jersey, have invented certain new and useful Improvements in Stump or Tree Extractors; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a stump-extractor or tree-puller of simple, strong, and durable construction, easily handled, and reliable and efficient in operation.

The invention consists in the improved stump-extractor and in the combination and arrangement of the various parts thereof, substantially as will be hereinafter more fully described and finally embodied in the clause claim.

Referring to the accompanying drawings, in which like letters of reference indicate corresponding parts in each of the several views, Figure 1 is a perspective view of my improved stump-extractor illustrated in an operative position; Fig. 2, an enlarged top plan view of the extractor and of the chains connected therewith; and Fig. 3, a detail end elevation of Fig. 2, the chains and the operating bar or lever being removed.

In said drawings, $a$ represents a metallic stock or frame penetrated by a tapering hole $b$, adapted to receive the correspondingly-shaped end of a removable bar or lever $c$.

The stock or frame $a$, which preferably is rectangular in cross-section, is provided on one side and substantially in its central portion with an outwardly-projecting lug, penetrated by a bolt $d$, to which is pivotally secured a shackle $e$, surrounding the said stock or frame—that is to say, extending over and around the opposite side thereof—and carrying one end of a chain $f$, to the other end of which is secured a hook $f'$.

At or near the ends of the frame or stock $a$ and on the side opposite to that having the projecting lug for the shackle $e$ are arranged lugs which are penetrated by bolts $i$ and $k$, to which are pivotally secured shackles $m$ and $n$, respectively, likewise extending over and around the opposite side of said frame or stock and connected to chains $o$ and $p$, having on their free ends hooks $o'$ and $p'$, respectively, all as clearly illustrated in the drawings. The chain $f$ of the shackle $e$ is adapted to be secured with its hook $f'$ to a rope or chain $g$, fastened in any desired manner to a tree or stump $h$, which must be stronger and firmer than the tree or stump $r$ to be extracted. To the said stump $r$ is secured a rope or chain $q$, adapted to be engaged by the respective hooks $o'$ and $p'$ of the chains $o$ and $p$, as described in the following operation:

After the frame or stock $a$ has been placed into substantially the position illustrated in Figs. 1 and 2 and after the chain $f$ has been secured to the rope or chain $g$ the chain $p$ is hooked to the rope $q$ on the stump $r$ to be extracted, while the chain $o$ is hooked at any convenient place to the chain $p$. The lever or bar $c$ is then forced over in the direction of the arrow R until it occupies substantially the position illustrated in dotted lines in Fig. 2. During this operation the pivotal connection of the shackle $e$ acts as the fulcrum for the stock or frame $a$, and the enormous force exerted upon the chain $f$ loosens the stump $r$ and its root from the soil. The chain $o$ is then connected with or hooked to the rope or chain $q$, while the chain $p$, which at that time is slack, is hooked into the chain $o$ at any convenient place. The lever or bar $c$ is now returned to its former position—that is to say, is forced over in the direction opposite to the arrow R, whereby, through the strain exerted upon the chain $i$, the stump $r$ is still further loosened or entirely withdrawn from the soil.

If the above-described operation is not sufficient to entirely withdraw the stump from the soil, the same is repeated, as will be manifest.

I do not intend to limit myself to the precise construction shown and described, as various alterations can be made without changing the scope of my invention; but

What I claim as new, and desire to secure by Letters Patent, is—

In a stump or tree extractor, the combination of an elongated tapering stock having a longitudinal tapering orifice therein and provided with integral lugs disposed on one side of said stock at each end thereof and on the other side approximately midway thereof, bolts penetrating said lugs, shackles pivotally secured to said bolts and extending transversely across and around the stock, chains provided with hooks and connected to said shackles, and a removable lever having one tapering end and adapted to be inserted in said orifice, substantially as described.

In testimony that I claim the foregoing I have hereunto set my hand this 11th day of February, 1898.

ALBERT FORRER.

Witnesses:
ALFRED GARTNER,
WM. D. BELL.